July 17, 1934.  C. E. ROSE  1,966,463
DENTAL FLOSS HOLDER
Filed Feb. 13, 1933
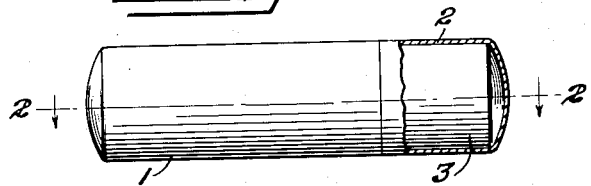
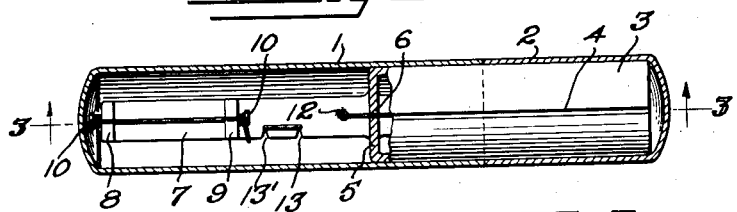
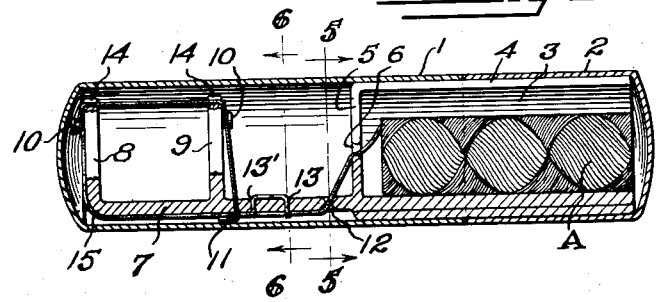
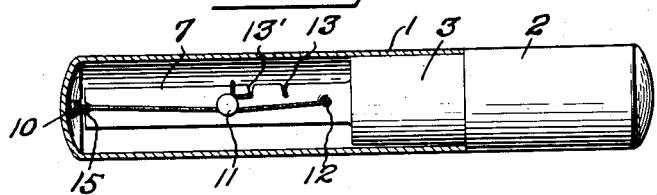
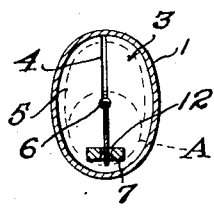
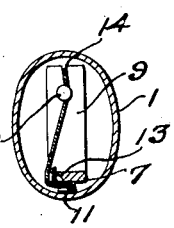
Catherine Elean Rose, INVENTOR
BY Victor J. Evans & Co.
ATTORNEY
WITNESS
H. J. Meader Patented July 17, 1934

1,966,463

UNITED STATES PATENT OFFICE 1,966,463

DENTAL FLOSS HOLDER

Catherine Elcan Rose, Hot Springs National Park, Ark.

Application February 13, 1933, Serial No. 656,628

1 Claim. (Cl. 132—92)

This invention relates to holders for dental floss and its general object is to provide a holder for securing a strand of dental floss in a taut condition and in a position whereby it can be conveniently and easily used in removing foreign matter from the teeth.

Another object of the invention is to provide a dental floss holder that is capable of receiving a complete spool of dental floss from which strands can be taken and easily and expeditiously threaded for use, and the spool is kept in a clean and sanitary covered condition at all times, in that it cannot be touched by the user after being placed in the holder, and the strand removed from the spool is kept accordingly when not in use.

A further object of the invention is to provide a dental floss holder that can be refilled with very little effort, is neat in appearance, can be carried upon the person of the user or in a purse or the like, is reasonably simple in construction, inexpensive to manufacture and extremely efficient in use and service.

This invention also consists in certain other features of construction and in the combination and arrangement of the several parts, to be hereinafter fully described, illustrated in the accompanying drawing and specifically pointed out in the appended claim.

In describing my invention in detail, reference will be had to the accompanying drawing wherein like characters denote like or corresponding parts throughout the several views, and in which:—

Figure 1 is a view partly in section of the dental floss holder which forms the subject matter of the present invention.

Figure 2 is an enlarged sectional view taken approximately on line 2—2 of Figure 1, looking in the direction of the arrows.

Figure 3 is a sectional view taken approximately on line 3—3 of Figure 2, looking in the direction of the arrows, Figure 4 is a sectional view taken longitudinally through one portion of the casing of my holder with the latter in elevation.

Figure 5 is a sectional view taken approximately on line 5—5 of Figure 3, looking in the direction of the arrows.

Figure 6 is a sectional view taken approximately on line 6—6 of Figure 3, looking in the direction of the arrows.

Referring to the drawing in detail, the reference numeral 1 indicates the body of the casing of my device and the casing includes a cap 2 which together with the body is substantially oval shape in configuration as will be noted upon inspection of Figures 5 and 6.

My device includes a housing 3 which is of a size to fit within the body 1, but it will be noted that the housing projects beyond one end of the body and the projecting portion frictionally receives the cap 2 which is disposed in contacting engagement with the open end of the body 1 as best shown in Figure 4.

The housing 3 is provided with an open end so that a spool or roll A of dental floss can be inserted within the housing, and the housing has its upper portion split longitudinally in order to provide a slot 4 which extends the entire length of the housing 3 as well as through a portion of the end wall 5 that is provided with an eye 6 at the bottom of the portion of the slot within the end wall as clearly shown in Figure 3.

Extending from adjacent the lower end of the end wall 5 and forwardly therefrom is a relatively narrow strip 7 that has formed on its free end an arm 8, the latter being disposed at right angles with respect to the strip that likewise has formed therewith substantially midway its ends, an arm 9 which cooperates with the arm 8 in a manner which will be presently described.

The arms 8 and 9 have extending from the opposed faces thereof studs 10, and a similar stud 11 extends from the strip 7, and from the wall thereof opposed to that from which extends the arms. Arranged in the strip 7 adjacent to its connection with the housing 3, is an opening or eye 12 that is provided with rounded edges as clearly shown in Figure 3, and outwardly beyond the opening 12 the strip 7 is provided with spaced notches 13 and 13' extending from one edge thereof. The inner wall of the notch 13 is beveled to form a sharpened edge for a purpose which will be later described. It will be noted that the free end of the arms 8 and 9 are notched as at 14 and a notch 15 is disposed at the juncture of the arm 8 with the strip 7, as best shown in Figure 4.

From the above description and disclosure of the drawing, it will be obvious that I have provided a dental floss holder that can be easily filled as the spool or roll A of dental floss is inserted in the housing 3, and in threading the holder, a strand of floss is removed or unwound from the spool and passed through the slot 4, until the strand reaches the eye 6. From the eye the strand is passed through the opening or eye 12, and thence wound about the headed stud 11, a single turn, and from the stud 11 the strand is disposed about the strip 7, through the notch 15, along the arm 8, and is then given a single turn about the stud 10 of the arm 8. The strand is then directed across the arms 8 and 9 and for that purpose is received in the notches 14. From the notch of the arm 9, the strand is directed downwardly and turned about the stud 10 of the arm 9, and again about the stud 11, from which it is directed rearwardly and passed through the notches 13' and 13 which grip and hold the strand fixed to prevent the same from becoming loose and as the notch 13 is provided with a sharpened edge, any superfluous portion of the strand can be cut as will be apparent upon inspection of Figure 6.

By providing the studs 10, it will be obvious that the portion of the strand directed across the arms 8 and 9 will be held in taut condition and due to the arrangement of the arms 8 and 9, that portion of the strand can be easily and conveniently used for removing foreign matter from the teeth.

When the device is not in use, it is disposed in the casing, therefore it can be threaded prior to being disposed in the case and it will then be ready for use, yet is retained in a clean and sanitary condition until put in use. However, the spool A is retained accordingly at all times due to the fact that it is arranged in the housing 3.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:

A dental floss holder comprising a housing adapted to receive a spool of dental floss having an open end and a closed end, said housing being slotted longitudinally with a slot extending through the closed end and terminating in an eye in said end, a relatively narrow strip extending from the closed end and being provided with an opening to receive a strand of floss extending through the eye and from the spool, spaced parallel arms formed with the strip and having notched upper ends, studs formed with the arms for securing the strands in the notches and across the arms, a stud secured to the strip for fixedly associating the strand thereto, said strip having means for securing the free end of the strand thereto, and cutting means included in the last mentioned means.

CATHERINE ELCAN ROSE.